(12) United States Patent
Ito

(10) Patent No.: US 11,272,103 B2
(45) Date of Patent: Mar. 8, 2022

(54) ROTATION OPERATION DEVICE THAT CAN BE OPERATED WITH CONSTANT FORCE AND ELECTRONIC APPARATUS

(71) Applicant: CANON KABUSHIKI KAISHA, Tokyo (JP)

(72) Inventor: Junji Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 16/889,904

(22) Filed: Jun. 2, 2020

(65) Prior Publication Data

US 2020/0389589 A1 Dec. 10, 2020

(30) Foreign Application Priority Data

Jun. 4, 2019 (JP) .............................. JP2019-104624

(51) Int. Cl.
*H04N 5/232* (2006.01)
*H04N 5/225* (2006.01)
*G03B 17/02* (2021.01)
*G05G 1/08* (2006.01)

(52) U.S. Cl.
CPC ......... *H04N 5/23245* (2013.01); *G03B 17/02* (2013.01); *H04N 5/2251* (2013.01); *G03B 2217/002* (2013.01); *G05G 1/08* (2013.01)

(58) Field of Classification Search
None
See application file for complete search history.

(56) References Cited

U.S. PATENT DOCUMENTS

| | | | | |
|---|---|---|---|---|
| 2012/0279841 A1* | 11/2012 | Nakajima | ............... | H01H 19/63 200/564 |
| 2014/0071301 A1* | 3/2014 | Asai | ................... | H04N 1/00397 348/207.99 |
| 2017/0126942 A1* | 5/2017 | Yamamoto | .......... | H04N 5/2253 |
| 2018/0278842 A1* | 9/2018 | Mabuchi | .................. | G05G 5/06 |

FOREIGN PATENT DOCUMENTS

JP 2009176470 A 8/2009
JP 2015032375 A 2/2015

* cited by examiner

*Primary Examiner* — Cynthia Segura
(74) *Attorney, Agent, or Firm* — Rossi, Kimms & McDowell LLP

(57) ABSTRACT

A rotation operation device that can be operated with a constant force, with high durability, low manufacturing costs, and less variation in operability between individual products thereof. The rotation operation device includes a rotation operation dial having a bottomed-cylindrical shape, a supporting member that rotatably supports the rotation operation dial, and an elastic member that is latched on the supporting member, to generate a click feeling. The inner peripheral surface of the rotation operation dial has a friction sliding portion circumferentially continuously formed with concave portions and convex portions. The supporting member has two protruding portions for latching the elastic member. The elastic member applies an urging force to the friction sliding portion, and is slid in a state in line contact with each of the two protruding portions at two symmetric locations, when the rotation operation member is rotated.

8 Claims, 4 Drawing Sheets

ROTATION OPERATION DEVICE THAT CAN BE OPERATED WITH CONSTANT FORCE AND ELECTRONIC APPARATUS

BACKGROUND OF THE INVENTION

Field of the Invention

The present invention relates to a rotation operation device that can be operated with a constant force and an electronic apparatus including the rotation operation device.

Description of the Related Art

Many of image capture apparatuses, such as digital cameras, which are examples of electronic apparatuses, have an operation member for selectively setting one of photographing modes for various types of photographing, such as a shutter speed priority mode, an aperture priority mode, and a photographing mode suited to user's preference or a photographing scene. As a device for setting a selected photographing mode from a plurality of photographing modes, a rotary-type operation device (hereinafter referred to as the "rotation operation device") is widely used.

As an example of the rotation operation device, Japanese Laid-Open Patent Publication (Kokai) No. 2009-176470 describes a rotation operation device including a dial rotatably mounted on an image capture apparatus body, and an elastic member having an engagement portion which is click-engaged with a friction sliding portion continuously formed on the inner periphery of the dial such that the friction sliding portion has recessed and protruding shapes. In the rotation operation device described in Japanese Laid-Open Patent Publication (Kokai) No. 2009-176470, ribs are provided on respective opposite sides of the engagement portion of the elastic member so as to stably stop the dial at a predetermined position, and also, a bearing provided in the image capture apparatus body to support a rotational shaft of the dial is formed with a recess so as to prevent the elastic member from colliding with the bearing when the elastic member is moved forward and backward.

Further, Japanese Laid-Open Patent Publication (Kokai) No. 2015-32375 describes a rotation operation device including a dial rotatably mounted on an image capture apparatus body, and an elastic member having two engagement portions to be click-engaged, at two axisymmetric locations, with a friction sliding portion continuously formed on the inner periphery of the dial such that the friction sliding portion has recessed and protruding shapes. In the rotation operation device described in Japanese Laid-Open Patent Publication (Kokai) No. 2015-32375, the two engagement portions are in surface contact with ribs provided on the image capture apparatus body, respectively.

However, in the rotation operation device described in Japanese Laid-Open Patent Publication (Kokai) No. 2009-176470, the engagement portion, which is single, provided on the elastic member is engaged with the inner peripheral surface of the dial. Therefore, there are concerns that due to liability of the dial being inclined toward one side, the operation feeling is degraded, and that there arises a problem that the durability of the rotation operation device is reduced by wear. Further, when the dial is in an intermediate position during rotation of the dial by a photographer for shifting the photographing mode from a predetermined photographing mode to a photographing mode adjacent thereto in position on the dial, the engagement portion provided on the elastic member is in a state separated from the ribs. As a result, a force in a bending direction is applied to the engagement portion by a frictional force of the outer end of the engagement portion of the elastic member, and hence there is a fear that the engagement portion is broken during the rotation operation.

On the other hand, in the rotation operation device described in Japanese Laid-Open Patent Publication (Kokai) No. 2015-32375, a cylindrical portion into which the rotational shaft of the dial is inserted is provided in the image capture apparatus body and the ribs are connected to the cylindrical portion. The above-described problem is solved by placing the two engagement portions, which are provided at opposite ends of the elastic member, in a state positioned and regulated by the ribs.

However, the elastic member has an arcuate shape formed by partially cutting out the annular shape, and the engagement portions are formed close to respective opposite ends of the elastic member. In other words, in the elastic member, only one side of each engagement portion is connected to the other portion of the elastic member, and hence when the dial is rotated by operation of a user, a force for rotating the engagement portion is applied to the engagement portion. As a result, the engagement portion of the elastic member is not slid in parallel with the rib of the image capture apparatus body, but is frictionally slid in a state ununiformly brought into contact (so-called one-side contact) with the rib, so that the force is applied in a direction of expanding the engagement portion. That is, since an unnecessary force is applied to each engagement portion of the elastic member, it is impossible to obtain a desired operation force, and the one-side contact causes variation in the required operation force between individual products of the rotation operation device. Further, there is a fear that there arises a problem of breakage of the engagement portions of the elastic member or a like problem during rotating operation by a user.

SUMMARY OF THE INVENTION

The present invention provides a rotation operation device that can be operated with a constant force, with high durability, low manufacturing costs, and less variation in operability between individual products thereof.

In a first aspect of the present invention, there is provided a rotation operation device comprising a rotation operation member having a bottomed-cylindrical shape, a supporting member that rotatably supports the rotation operation member, and an elastic member that is latched on the supporting member, to generate a click feeling, wherein the rotation operation member includes a friction sliding portion formed on an inner peripheral surface thereof, the friction sliding portion being continuously formed with concave portions and convex portions in a circumferential direction, wherein the supporting member has a plurality of protruding portions for latching the elastic member, and wherein the elastic member applies an urging force to the friction sliding portion, and is slid in a state in line contact with each of the plurality of protruding portions, at a plurality of locations associated with each of the plurality of protruding portions, when the rotation operation member is rotated.

In a second aspect of the present invention, there is provided an electronic apparatus including the rotation operation device.

According to the present invention, it is possible to provide a rotation operation device that can be operated with a constant force, with high durability, low manufacturing costs, and less variation in operability between individual products.

Further features of the present invention will become apparent from the following description of exemplary embodiments (with reference to the attached drawings).

DESCRIPTION OF THE EMBODIMENTS

The present invention will now be described in detail below with reference to the accompanying drawings showing embodiments thereof.

Here, an image capture apparatus will be described as an example of an electronic apparatus including a rotation operation device according to the present invention. However, the electronic apparatus including the rotation operation device according to the present invention is not limited to the image capture apparatus.

Figure 1:
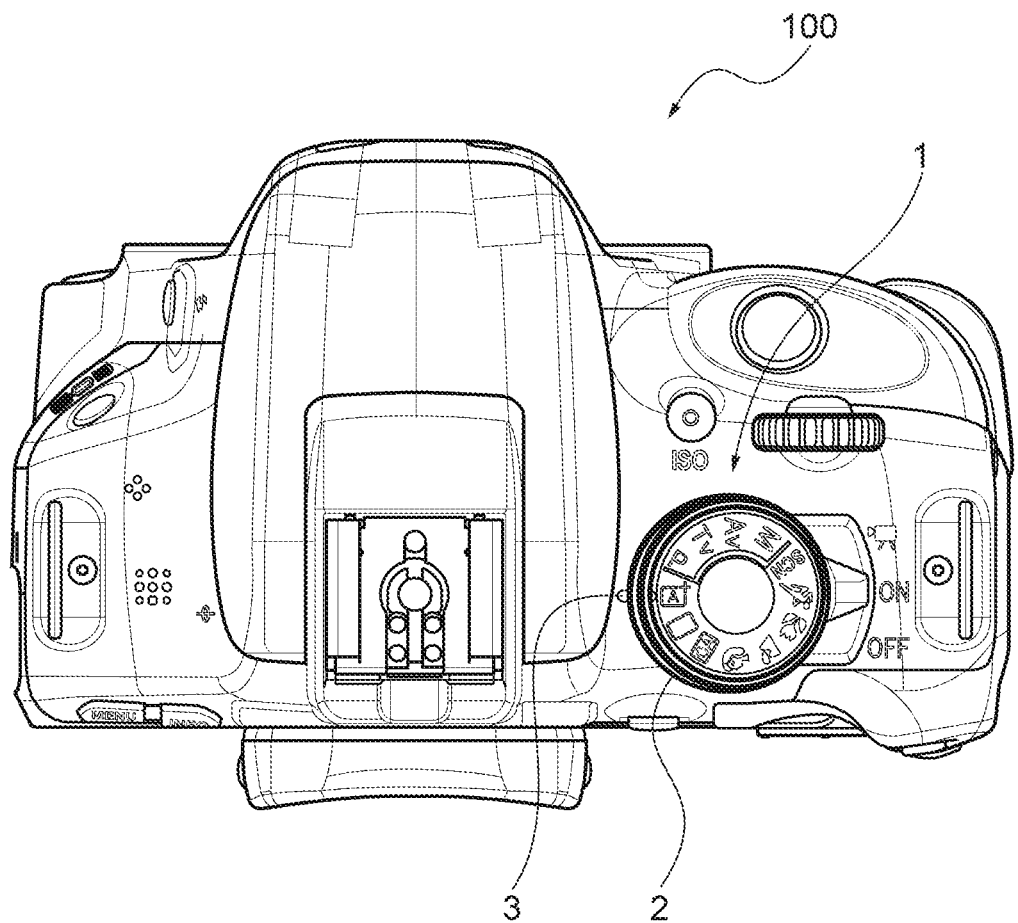
FIG. 1 is a top view of an image capture apparatus according to an embodiment of the present invention.

FIG. 1 is a top view of an image capture apparatus 100 according to an embodiment of the present invention. On the top of the image capture apparatus 100, there is disposed a rotation operation device 1 for easily setting a desired one of a plurality of photographing modes provided in the image capture apparatus 100. Examples of the photographing modes provided in the image capture apparatus 100 include an automatic photographing mode in which exposure control is entrusted to a controller of the image capture apparatus 100 and a manual photographing mode in which a photographer can set a shutter speed and an aperture to desired values.

The rotation operation device 1 has a rotation operation dial 2 (rotation operation member) which is rotated by operation of a user. On the top surface of the rotation operation dial 2, images as schematic representation of the photographing modes capable of being set are provided e.g. by printing at respective predetermined rotational angles. Further, an index part 3 is provided e.g. by printing at a location adjacent to the rotation operation dial 2 on the top surface of the image capture apparatus 100. The user adjusts an image on the rotation operation dial 2, which indicates a desired photographing mode, to the index part 3 by rotating the rotation operation dial 2. With this, the photographing mode of the image capture apparatus 100 is set to the desired photographing mode associated with the image on the rotation operation dial 2, which is opposed to the index part 3. Note that FIG. 1 shows a state in which the photographing mode is set to the automatic photographing mode.

Figure 2A:
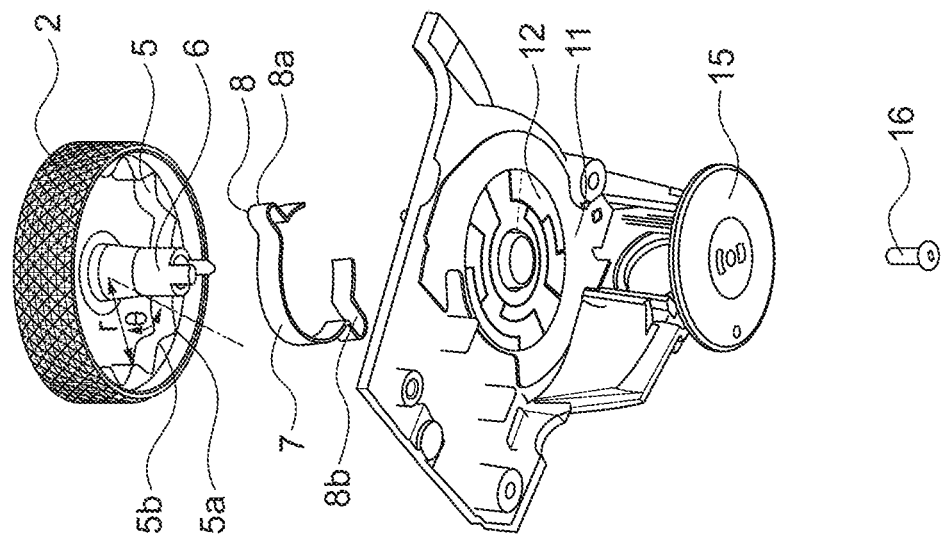
FIGS. 2A and 2B are exploded perspective views of a structure of a rotation operation device and an exterior cover of the image capture apparatus, on which the rotation operation device is disposed.
Figure 2B:
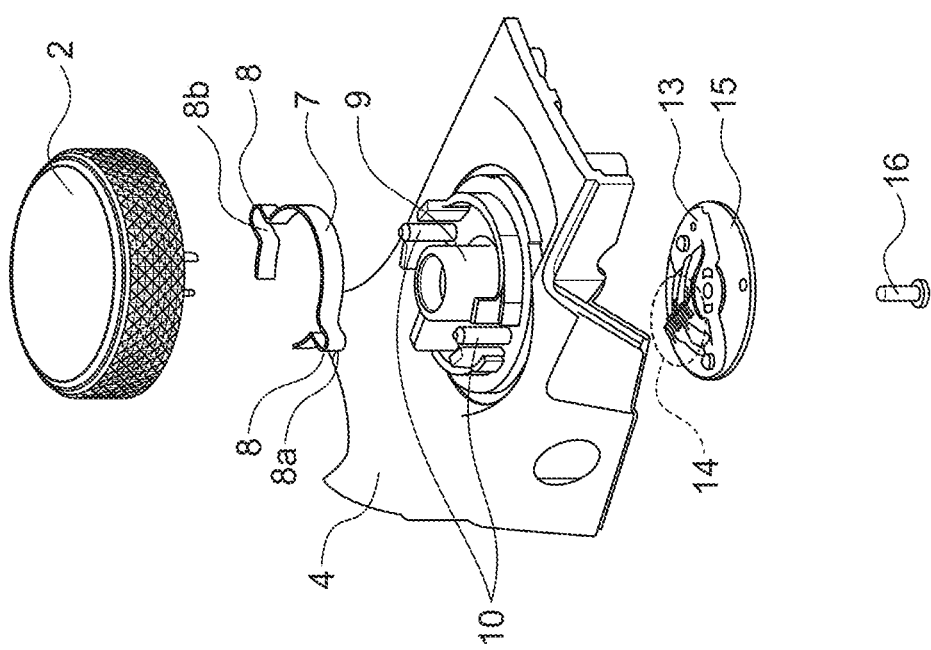

FIGS. 2A and 2B are exploded perspective views of a structure of the rotation operation device 1 and an exterior cover 4 of the image capture apparatus 100, on which the rotation operation device 1 is disposed. FIG. 2A is an exploded perspective view as viewed from the appearance side of the image capture apparatus 100 and FIG. 2B is an exploded perspective view as viewed from the inside of the image capture apparatus 100.

The rotation operation dial 2 has a bottomed substantially cylindrical shape. The outer peripheral surface of the rotation operation dial 2 is formed with fine recesses and protrusions which function as a nonslip portion when the rotation operation dial 2 is rotated by operation of the user. On the other hand, the inner peripheral surface of the rotation operation dial 2 is provided with a friction sliding portion 5 continuously formed with concave portions 5a and convex portions 5b along the whole circumference thereof (360 degrees). The friction sliding portion 5 has, as shown in FIG. 2B, a smooth wave shape such that a distance r from the center of rotation of the rotation operation dial 2 to the friction sliding portion 5 changes according to an angle θ such that the distance draws a sine wave.

A rotational shaft portion 6 having a substantially columnar shape is disposed in a central portion of the inside of the rotation operation dial 2. Further, an elastic member 7 (urging member) having a spring property, which is made by forming a plate member into a substantially arcuate shape, is disposed inside the rotation operation dial 2. The elastic member 7 is formed with engagement portions 8 each of which protrudes outward at locations close to respective ends thereof, with a substantially U-shape (closed outwardly and open inwardly) as viewed from an axial direction of the rotational center axis. The two engagement portions 8 are formed such that they are symmetric with respect to the rotational shaft portion 6 in a state in which the elastic member 7 is attached to the exterior cover 4 and that the elastic member 7 has a line-symmetric shape. The two engagement portions 8 apply an urging force to the friction sliding portion 5 and are click-engaged with the friction sliding portion 5. The rotation operation dial 2 is stabilized in a state in which the two engagement portions 8 are in contact with the concave portions 5a of the friction sliding portion 5, and a predetermined photographing mode is set in this state.

The exterior cover 4 is a supporting member that rotatably supports the rotation operation dial 2. At a location on the exterior cover 4 where the rotation operation dial 2 is disposed, a dial supporting portion 9 (shaft supporting portion) is formed into a substantially hollow cylindrical shape such that the rotational shaft portion 6 of the rotation operation dial 2 is inserted therein, for rotatably supporting the rotational shaft portion 6. Further, the exterior cover 4 has protruding portions 10 each in a substantially columnar shape, as latching portions for latching the elastic member 7, formed at two locations outward of the dial supporting portion 9 and symmetric with respect to the dial supporting portion 9. The axial direction of each protruding portion 10 is substantially parallel to the axial direction of the dial supporting portion 9.

Although the protruding portions 10 are formed at the two locations, in the following description, the two protruding portions 10 are simply referred to as the "protruding portions 10" without discriminating between them, and similarly, the two engagement portions 8 are referred to as the "engagement portions 8" unless it is necessary to discriminate between them.

Figure 3A:
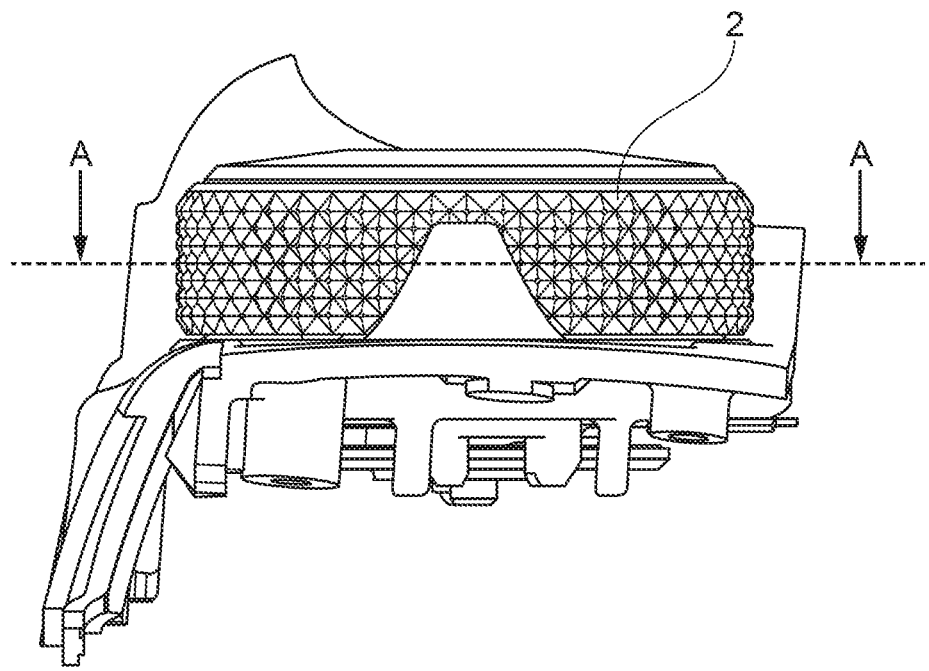
FIGS. 3A to 3C are a side view and cross-sectional views useful in explaining a click operation performed when a rotation operation dial as a component of the rotation operation device is rotated by operation of a user.
Figure 3B:
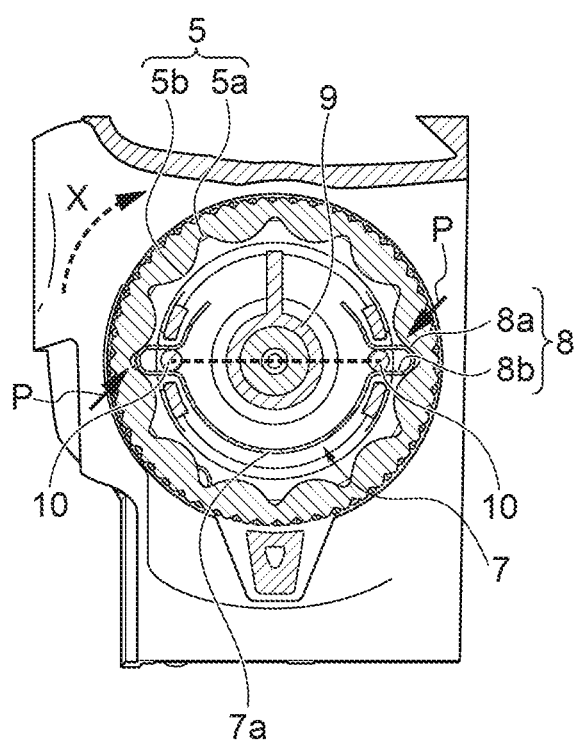
Figure 3C:
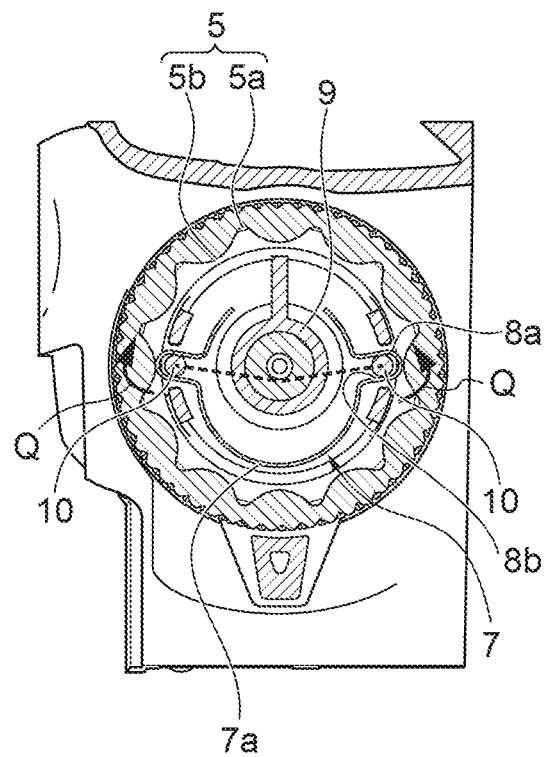

One of the engagement portions 8 of the elastic member 7 is latched on an associated one of the protruding portions 10 (see FIGS. 3B and 3C). That is, an inner wall surface 8b of each engagement portion 8 of the elastic member 7 and the associated protruding portion 10 are brought into line contact with each other along the axial direction of the protruding portion 10, whereby the position of the elastic member 7 with respect to the exterior cover 4 is regulated.

In a state in which the rotation operation dial 2 and the elastic member 7 are attached to the exterior cover 4, an outer end (closed outer end) of each engagement portion 8 protrudes outward with a predetermine range of spacing from the protruding portion 10 and an outer wall surface 8a of the engagement portion 8 is always in contact with the friction sliding portion 5. That is, the elastic member 7 is in a state always urged in a direction in which the outer wall surface 8a of the engagement portion 8 is brought into contact with the friction sliding portion 5 (radial direction of the rotation operation dial 2 from the center toward the outside) with its position being regulated by the protruding portion 10. Therefore, when the rotation operation dial 2 is rotated, the elastic member 7 is flexed in the state in which its position is regulated by the protruding portion 10 according to the recessed and protruding shapes (concave portions 5a and convex portions 5b) of the friction sliding portion 5 with which the outer end of the engagement portion 8 is in contact, whereby a click feeling is generated.

Note that in a state in which the engagement portions 8 are in contact with the concave portions 5a of the friction sliding portion 5 (see FIG. 3B), it is desirable that the protruding portions 10 are positioned outside an arc drawn by an arcuate shape portion 7a connecting the engagement portions 8. With this, it is possible to make it difficult for the engagement portions 8 to slip off from the protruding portions 10.

A flexible circuit board 11 on which a conductive pattern 12 is printed for discriminating between respective phases associated with the photographing modes is attached to a reverse side of the exterior cover 4 (inside the image capture apparatus 100) e.g. with a double-sided adhesive tape, not shown. Further, a phase contact piece 13 having a plurality of contacts 14 which are brought into contact with the conductive pattern 12 of the flexible circuit board 11 is fixed to a disc-shaped reinforcing member 15, and the reinforcing member 15 is fixed to the rotation operation dial 2 by a fastening member 16. With this arrangement, when the rotation operation dial 2 is rotated, the phase contact piece 13 and the reinforcing member 15 are rotated in unison with the rotation operation dial 2.

The phase contact piece 13 is fixed to the reinforcing member 15 e.g. by caulking. The phase contact piece 13 is formed of a conductive material having elasticity and the plurality of contacts 14 each have a bent shape with elasticity (spring property) in the axial direction of the rotation central axis. The reinforcing member 15 is formed of e.g. resin.

FIGS. 3A to 3C are views useful in explaining a click operation of the rotation operation device 1 performed when the rotation operation dial 2 is rotated. FIG. 3A is a side view of the rotation operation device 1. FIG. 3B is a cross-sectional view taken along A-A in FIG. 3A, showing a state in which the rotation operation dial 2 is stopped and stable, with a predetermined photographing mode being selected. FIG. 3C is a cross-sectional view taken along A-A in FIG. 3A, showing an intermediate state of the rotation operation dial 2 being rotated in order to change the photographing mode.

In the rotation operation dial 2, the friction sliding portion 5 has the concave portions 5a and the convex portions 5b, both twelve in number. In a state in which the elastic member 7 is assembled in the rotation operation dial 2 (the rotation operation device 1 is assembled to the image capture apparatus 100), the engagement portions 8 of the elastic member 7 urge the friction sliding portion 5 in an opening direction of its own from the center of rotation of the rotation operation dial 2 toward the outer peripheral side. Therefore, as shown in FIG. 3B, the outer end of each engagement portion 8 is fitted in (brought into contact with) one of the concave portions 5a of the friction sliding portion 5, whereby it is possible to stop the rotation operation dial 2 in a stable position. In a state in which the rotation operation dial 2 is stopped in the stable position, the inner wall surface 8b of each engagement portion 8 is in contact with the protruding portion 10 provided on the exterior cover 4. Here, since the protruding portion 10 has a substantially columnar shape, the inner wall surface 8b of the engagement portion 8 and the protruding portion 10 are in line contact with each other at substantially symmetric locations, as shown in FIG. 3B.

As the rotation operation dial 2 is rotated, as shown in FIG. 3C, the outer ends of the engagement portions 8 of the elastic member 7 climb onto opposed ones of the convex portions 5b of the friction sliding portion 5. Here, the engagement portions 8 of the elastic member 7 are formed at respective locations close to the opposite ends of the arc-shaped portion 7a which is curved like a bow. In other words, the two engagement portions 8 are connected by the arc-shaped portion 7a. Therefore, in a case where the rotation operation dial 2 is rotated from the state shown in FIG. 3B in a direction indicated by an arrow X, the frictional force is applied to each engagement portion 8 by the friction sliding portion 5 in a direction indicated by an arrow P.

After that, as the rotation operation dial 2 is further rotated, the position of the contact point between the engagement portion 8 of the elastic member 7 and the friction sliding potion 5 is shifted so that the orientation of the arrow P is gradually changed into a right-left direction in FIG. 3B. At this time, since the two engagement portions 8 are connected by the arc-shaped portion 7a, each engagement portion 8 is not moved in the right-left direction toward the center of the rotation operation dial 2 but is rotationally slid on the protruding portion 10 in a direction indicated by an arrow Q in FIG. 3C. As a result, in the state shown in FIG. 3C, a rotational force in the direction indicated by the arrow Q is generated on each of the two engagement portions 8, so that the two engagement portions 8 are each not moved in the right-left direction but slid on the protruding portions 10 while being rotated.

At this time, since each protruding portion 10 has the substantially columnar shape, even when the engagement portions 8 of the elastic member 7 are rotationally slid on the protruding portions 10, the inner wall surface 8b of each engagement portion 8 and the associated protruding portion 10 are always in line contact with each other at symmetric locations. Therefore, no situation occurs in which the engagement portion 8 is brought into one-side contact with the protruding portion 10 and hence a force in the circumferential direction for increasing the width of the engagement portion 8 (force for widening the opening of the engagement portion 8 on the outer end side) does not act on the engagement portion 8. As a result, the engagement portions 8 can be smoothly slid on the friction sliding portion 5 without excessive load on the engagement portions 8.

When the rotation operation dial 2 is further rotated, the engagement portions 8 of the elastic member 7 drop in the associated concave portions 5a of the friction sliding portion 5, whereby the elastic member 7 performs amplitude shift (is moved in an amplitude direction) to function as a spring, which generates a click feeling to the user.

As described above, according to the rotation operation device 1, when the rotation operation dial 2 is rotated, it is possible to perform the smooth operation without variation in a rotation operation force during rotation. Further, the rotation operation device 1 can be manufactured with low costs because of its simple structure, and further, the engagement portions 8 of the elastic member 7 are prevented from being brought into one-side contact with the protruding portions 10, and hence it is possible to realize high durability of the rotation operation device 1.

Figure 4:
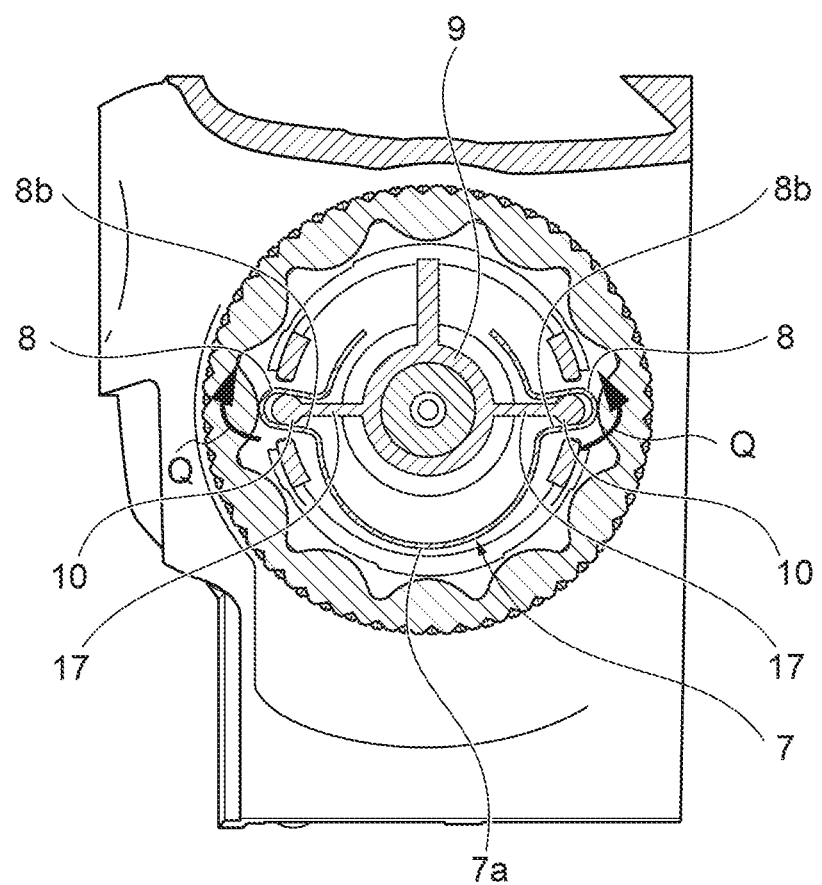
FIG. 4 is a cross-sectional view useful in explaining a variation of the rotation operation device shown in FIGS. 3A to 3C.

Next, a variation of the above-described rotation operation device 1 will be described. FIG. 4 is a view showing the arrangement of the variation of the exterior cover 4 at the same cross-section as shown in FIG. 3C. The protruding portions 10 are connected, by extended portions 17, to the dial supporting portion 9 through which the rotational shaft of the rotation operation dial 2 is inserted. With this, when the rotation operation dial 2 is rotated, causing the engagement portions 8 of the elastic member 7 to slide on the protruding portions 10, the load applied to the protruding portions 10 is received by the protruding portions 10 and the extended portions 17. Therefore, compared with a case where the load is received only by the protruding portions 10, it is possible to improve the service life and the reliability of the variation of the rotation operation device 1. Further, the exterior cover 4 is generally made by resin molding, and hence by connecting the protruding portions 10 and the dial supporting portion 9 by the extended portions 17, it is possible to prevent occurrence of a filling failure when performing resin molding, and form the dial supporting portion 9, the protruding portions 10, and the extended portions 17, with reliability.

In the arrangement shown in FIG. 4 as well, as described with reference to FIG. 3C, when the rotation operation dial 2 is rotated, the engagement portions 8 of the elastic member 7 are not moved in the right-left direction toward the center where the dial supporting portion 9 is disposed but are rotationally slid on the protruding portions 10 in the direction indicated by the arrow Q. At this time, even when the engagement portions 8 are rotationally slid on the protruding portions 10, each engagement portion 8 is in a state in which the inner wall surface 8b thereof are always in line contact with the protruding portion 10 at two locations which are symmetric with each other.

Here, the width of each extended portion 17 (width in a direction orthogonal to a direction connecting the dial supporting portion 9 and the protruding portion 10 and the axial direction of the dial supporting portion 9) is smaller than the outer diameter of the protruding portion 10. Therefore, even when the engagement portions 8 of the elastic member 7 are rotationally slid, the end of each engagement portion 8 on the inner peripheral side (open side end) and its periphery are prevented from being brought into contact with the extended portion 17, and therefore, it is possible to prevent the engagement portion 8 from being brought into one-side contact with the protruding portion 10. As a result, in the arrangement in which the extended portions 17 are provided, the engagement portions 8 can also be smoothly slid on the friction sliding portion 5 without excessive load on the engagement portions 8.

Note that in FIG. 4, the width of each of the two extended portions 17 is formed to be symmetric with respect to a line connecting the two protruding portions 10 and the dial supporting portion 9. However, this width is not necessarily required to be symmetric insofar as it is possible to prevent occurrence of a situation in which when the rotation operation dial 2 is rotated, the inner end of each engagement portion 8 or its periphery of the elastic member 7 is brought into contact with the extended portion 17, causing one-side contact between the engagement portion 8 and the protruding portion 10. For example, the width of one of the two extended portions 17 may be made smaller than the outer diameter of the protruding portion 10. Further, the extended portion 17 may be formed into a shape gradually reduced in width as it extends from the protruding portion 10 toward the dial supporting portion 9.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-104624, filed Jun. 4, 2019, which is hereby incorporated by reference herein in its entirety.

What is claimed is:

1. A rotation operation device comprising:
   a rotation operation member having a bottomed-cylindrical shape;
   a supporting member that rotatably supports the rotation operation member; and
   an elastic member that is latched on the supporting member, to generate a click feeling,
   wherein the rotation operation member includes a friction sliding portion formed on an inner peripheral surface thereof, the friction sliding portion being continuously formed with concave portions and convex portions in a circumferential direction,
   wherein the supporting member has a plurality of protruding portions for latching the elastic member, and
   wherein the elastic member applies an urging force to the friction sliding portion, and is slid in a state in line contact with each of the plurality of protruding portions, via a plurality of portions thereof at respective locations associated with each of the plurality of protruding portions, when the rotation operation member is rotated.

2. The rotation operation device according to claim 1, wherein the elastic member has an arcuate shape, and
   wherein engagement portions each having a U-shape, which are engaged with the protruding portions and are in contact with the friction sliding portion, are provided at respective locations close to ends of the elastic member.

3. The rotation operation device according to claim 1, wherein the plurality of protruding portions are two protruding portions, and
   wherein the two protruding portions each have a columnar shape.

4. The rotation operation device according to claim 3, wherein the supporting member has a shaft supporting potion that supports a rotational shaft portion of the rotation operation member, and
   wherein the two protruding portions are arranged at locations symmetric with respect to the shaft supporting portion.

5. The rotation operation device according to claim 4, wherein the supporting member has extended portions that connect the protruding portions and the shaft supporting portion, and
   wherein the width of the extended portions is smaller than the outer diameter of the protruding portions.

6. The rotation operation device according to claim 5, wherein the width of the extended portions becomes smaller as the extended portions extend from the protruding portions toward the shaft supporting portion.

7. The rotation operation device according to claim 1, wherein the plurality of protruding portions are two protruding portions, and
  wherein the elastic member applies the urging force to the friction sliding portion, and is slid in a state in line contact with each of the two protruding portions, via two portions thereof at symmetric locations associated with each of the two protruding portions, when the rotation operation member is rotated.

8. An electronic apparatus including the rotation operation device according to claim 1.

* * * * *